(12) United States Patent
Jentz et al.

(10) Patent No.: US 9,086,040 B2
(45) Date of Patent: Jul. 21, 2015

(54) FUEL SYSTEM DEGRADATION TEST USING TWO FUEL TANKS

(71) Applicant: Ford Global Technologies, LLC, Dearborn, MI (US)

(72) Inventors: Robert Roy Jentz, Westland, MI (US); Scott A. Bohr, Plymouth, MI (US); Russell Randall Pearce, Ann Arbor, MI (US); Aed M Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 259 days.

(21) Appl. No.: 13/654,257

(22) Filed: Oct. 17, 2012

(65) Prior Publication Data
US 2014/0107906 A1    Apr. 17, 2014

(51) Int. Cl.
| | |
|---|---|
| *F02M 37/18* | (2006.01) |
| *G01M 3/00* | (2006.01) |
| *F02M 37/00* | (2006.01) |
| *B60W 20/00* | (2006.01) |
| *G01M 3/02* | (2006.01) |
| *F02M 25/08* | (2006.01) |
| *F02D 41/22* | (2006.01) |

(52) U.S. Cl.
CPC ........... *F02M 37/18* (2013.01); *B60W 20/1086* (2013.01); *F02M 25/0809* (2013.01); *F02M 37/0088* (2013.01); *G01M 3/00* (2013.01); *G01M 3/02* (2013.01); *B60W 2560/04* (2013.01); *F02D 2041/225* (2013.01); *F02M 25/08* (2013.01); *F02M 25/0818* (2013.01)

(58) Field of Classification Search
CPC ... F02M 37/18; F02M 37/04; F02M 37/0088; F02M 25/0818; F02M 25/08; F02D 2041/225; G01M 3/00
USPC .......... 701/102, 101, 114; 123/516, 518–521; 137/256, 264, 265, 565.22, 565.23
See application file for complete search history.

(56) References Cited

U.S. PATENT DOCUMENTS

| | | | | |
|---|---|---|---|---|
| 3,962,882 | A * | 6/1976 | Gee et al. | 62/50.1 |
| 5,615,702 | A * | 4/1997 | Dawans et al. | 137/255 |
| 5,628,349 | A * | 5/1997 | Diggins et al. | 141/3 |
| 5,913,294 | A * | 6/1999 | Takahashi et al. | 123/198 DB |
| 5,983,932 | A | 11/1999 | Wagner et al. | |
| 6,283,142 | B1 | 9/2001 | Wheeler et al. | |
| 6,607,005 | B2 | 8/2003 | Viebahn et al. | |
| 6,659,122 | B1 * | 12/2003 | Zahdeh et al. | 137/256 |
| 6,913,002 | B2 | 7/2005 | Mashimo et al. | |
| 7,107,971 | B2 * | 9/2006 | Spink et al. | 123/520 |
| 7,963,150 | B2 * | 6/2011 | Haag | 73/49.2 |
| 8,602,010 | B2 * | 12/2013 | Chishima et al. | 123/575 |
| 2009/0306873 | A1 * | 12/2009 | Rogers et al. | 701/101 |
| 2010/0229966 | A1 * | 9/2010 | Elwart et al. | 137/485 |
| 2011/0240896 | A1 * | 10/2011 | Young et al. | 251/129.15 |

* cited by examiner

*Primary Examiner* — Mahmoud Gimie
(74) *Attorney, Agent, or Firm* — James Dottavio; Alleman Hall McCoy Russell & Tuttle LLP (57) ABSTRACT

Embodiments for monitoring fuel system degradation are provided. In one example, a method for a vehicle comprises evacuating fuel from a first fuel tank to a second fuel tank, and indicating fuel system degradation in response to a change in fuel system pressure following the evacuation of fuel. In this way, fuel system degradation may be indicated without use of a separate pressure building device.

19 Claims, 4 Drawing Sheets

FUEL SYSTEM DEGRADATION TEST USING TWO FUEL TANKS

FIELD

The present disclosure relates to a fuel system for an internal combustion engine.

BACKGROUND AND SUMMARY

Vehicles may be fitted with evaporative emission control systems to reduce the release of fuel vapors to the atmosphere. For example, vaporized hydrocarbons (HCs) from a fuel tank may be stored in a fuel vapor canister packed with an adsorbent which adsorbs and stores the vapors. At a later time, when the engine is in operation, the evaporative emission control system allows the vapors to be purged into the engine intake manifold for use as fuel. However, leaks in the emissions control system can inadvertently allow fuel vapors to escape to the atmosphere. Thus, various approaches are used to identify such leaks.

One such approach for leak detection includes sealing off the fuel tank, canister, and various conduits from atmosphere following engine shut-off and allowing pressure in the fuel system to build as heat is rejected from the engine to the fuel system. Fuel system degradation is then indicated if a rate of change of fuel system pressure is different than an expected change in pressure.

The inventors herein have recognized a few issues with the above approach. If the fuel system includes a fuel tank filled with low-volatility fuel, such as ethanol, sufficient pressure may not build in the fuel system due to the lack of vapors emitted by the ethanol fuel. Furthermore, if the vehicle is a hybrid vehicle, the engine may not generate sufficient heat to allow pressure to build in the fuel system.

Accordingly, embodiments are provided for detecting fuel system degradation without relying on generation of fuel system vapors. In one embodiment, a method comprises evacuating fuel from a first fuel tank to a second fuel tank, and indicating fuel system degradation in response to a change in fuel system pressure following the evacuation of fuel.

In this way, pressure may be built in the fuel system by evacuating fuel from the first tank to the second tank. When the fuel is evacuated, the resultant change in volume to the fuel tanks will cause a change in pressure that may be monitored to indicate fuel system degradation. In doing so, separate components for applying pressure may be dispensed with, saving engine packaging space and increasing engine efficiency.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
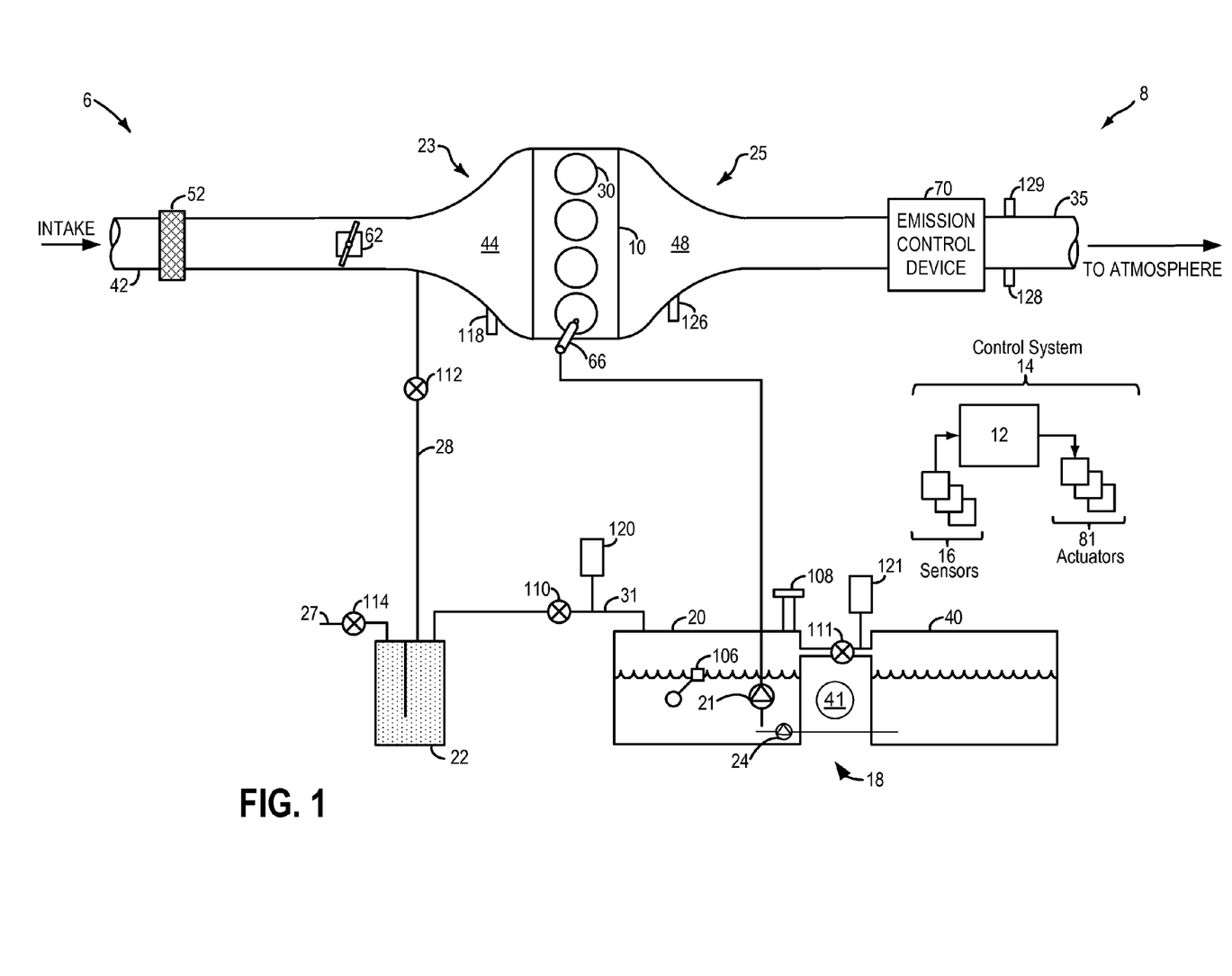
FIG. 1 shows a schematic depiction of a vehicle including an engine and a fuel system having a primary and secondary fuel tank.

The use of naturally-built fuel system pressure provides for an inexpensive mechanism to test for fuel system degradation without the inclusion of additional components, such as vacuum pumps, to the vehicle. However, the building of pressure typically relies on the production of fuel vapors in the fuel tank resulting from heat rejection from the engine, and subsequent condensation of the fuel vapors as the engine cools. In vehicles configured to operate under battery power in some conditions, or in vehicles operated with low-volatility fuels, such as ethanol or ethanol blends, sufficient vapors may not be produced to perform the fuel system degradation test. To manipulate the vapor space of a fuel tank, resulting in a natural increase or decrease in fuel system pressure, fuel may be evacuated from the fuel tank to a secondary tank while the fuel system is sealed off from atmosphere. After a threshold pressure has been reached in the fuel system, the change in pressure may be monitored, and if the pressure changes by more or less than a threshold amount, fuel system degradation (e.g., a leak) may be indicated. FIG. 1 shows a vehicle including a fuel system with a first fuel tank and a second fuel tank and a controller configured to carry out the method of FIG. 2. FIG. 3 illustrates an example change in fuel system pressure during a leak detection test.

FIG. 1 shows a schematic depiction of a vehicle system 6 that can derive propulsion power from engine system 8. Vehicle system 6 may be a conventional vehicle powered solely through combustion, or it may be a hybrid vehicle system that can derive propulsion power from engine system 8 and/or an on-board energy storage device (not shown), such as a battery system. An energy conversion device, such as a generator (not shown), may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Engine system 8 is coupled to a fuel system 18. Fuel system 18 includes a fuel tank 20 coupled to a fuel pump 21 and a fuel vapor canister 22. During a fuel tank refueling event, fuel may be pumped into the vehicle from an external source through refueling door 108. Fuel tank 20 may hold a plurality of fuel blends, including fuel with a range of alcohol concentrations, such as various gasoline-ethanol blends, including E10, E85, gasoline, etc., and combinations thereof. A fuel level sensor 106 located in fuel tank 20 may provide an indication of the fuel level ("Fuel Level Input") to controller 12. As depicted, fuel level sensor 106 may comprise a float connected to a variable resistor. Alternatively, other types of fuel level sensors may be used.

A secondary fuel tank 40 may be coupled to fuel tank 20. For example, fuel tank 20 and secondary fuel tank 40 may comprise a saddle fuel tank configured to be placed over the engine driveline 41. Secondary fuel tank may hold additional fuel that is metered to fuel tank 20 via a jet pump 24. Jet pump 24 may transfer fuel from secondary fuel tank 40 to fuel tank 20, based on a signal received from controller 12, for example. Jet pump 24 may have inlet positioned in secondary fuel tank 40 and an outlet positioned in fuel tank 20. However, under some conditions, jet pump 24 may operate in the reverse direction to transfer fuel from fuel tank 20 to secondary fuel tank 40. Further, in some embodiments, jet pump 24 and fuel pump 21 may be combined into a single pump unit.

A conduit may couple fuel tank 20 to secondary fuel tank 40 to allow vapors produced in secondary fuel tank 40 to be routed to canister 22. A valve 111 may close off fuel tank 20 from secondary fuel tank 40 under certain conditions, such as during a fuel system leak detection test, described below. While two separate fuel tanks are depicted in FIG. 1, it is to be understood that a single common fuel tank with multiple separate chambers may also be used without departing from the scope of this disclosure. Further, secondary fuel tank 40 may include a fuel level sensor and/or a refueling door similar to fuel tank 20.

Fuel pump 21 is configured to pressurize fuel delivered to the injectors of engine 10, such as example injector 66. While only a single injector 66 is shown, additional injectors are provided for each cylinder. It will be appreciated that fuel system 18 may be a return-less fuel system, a return fuel system, or various other types of fuel system. Vapors generated in fuel tank 20 may be routed to fuel vapor canister 22, via conduit 31, before being purged to the engine intake 23.

Fuel vapor canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 22 may be purged to engine intake 23 by opening canister purge valve 112. While a single canister 22 is shown, it will be appreciated that fuel system 18 may include any number of canisters.

Canister 22 includes a vent 27 for routing gases out of the canister 22 to the atmosphere when storing, or trapping, fuel vapors from fuel tank 20. Vent 27 may also allow fresh air to be drawn into fuel vapor canister 22 when purging stored fuel vapors to engine intake 23 via purge line 28 and purge valve 112. While this example shows vent 27 communicating with fresh, unheated air, various modifications may also be used. Vent 27 may include a canister vent valve 114 to adjust a flow of air and vapors between canister 22 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister.

If vehicle system 6 is a hybrid vehicle, it may have reduced engine operation times due to the vehicle being powered by engine system 8 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve 110 may be optionally included in conduit 31 such that fuel tank 20 is coupled to canister 22 via the valve. During regular engine operation, isolation valve 110 may be kept closed to limit the amount of diurnal or "running loss" vapors directed to canister 22 from fuel tank 20. During refueling operations, and selected purging conditions, isolation valve 110 may be temporarily opened, e.g., for a duration, to direct fuel vapors from the fuel tank 20 to canister 22. By opening the valve during purging conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows isolation valve 110 positioned along conduit 31, in alternate embodiments, the isolation valve may be mounted on fuel tank 20.

One or more pressure sensors 120, 121 may be coupled to fuel system 18 for providing an estimate of a fuel system pressure. In one example, the fuel system pressure is a fuel tank pressure, wherein pressure sensor 120 is a fuel tank pressure sensor coupled to fuel tank 20 for estimating a fuel tank pressure or vacuum level and pressure sensor 121 is a fuel tank pressure sensor coupled to secondary fuel tank 40 for estimating a fuel tank pressure or vacuum level. While the depicted example shows pressure sensor 120 coupled between the fuel tank and canister 22, specifically between the fuel tank and isolation valve 110, in alternate embodiments, the pressure sensor may be directly coupled to fuel tank 20. In still other embodiments, a first pressure sensor may be positioned upstream of the isolation valve (between the isolation valve and the canister) while a second pressure sensor is positioned downstream of the isolation valve (between the isolation valve and the fuel tank), to provide an estimate of a pressure difference across the valve.

Fuel vapors released from canister 22, for example during a purging operation, may be directed into engine intake manifold 44 via purge line 28. The flow of vapors along purge line 28 may be regulated by canister purge valve 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) or manifold vacuum (ManVac) may be obtained from MAP sensor 118 coupled to intake manifold 44, and communicated with controller 12. Alternatively, MAP may be inferred from alternate engine operating conditions, such as mass air flow (MAF), as measured by a MAF sensor (not shown) coupled to the intake manifold.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open isolation valve 110 while closing canister purge valve (CPV) 112 to direct refueling vapors into canister 22 while preventing fuel vapors from being directed into the intake manifold.

As another example, the fuel system may be operated in a refueling mode (e.g., when fuel tank refueling is requested by a vehicle operator), wherein the controller 12 may open isolation valve 110, while maintaining canister purge valve 112 closed, to depressurize the fuel tank before allowing fuel to be added therein. As such, isolation valve 110 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 12 may open canister purge valve 112 while closing isolation valve 110. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 22 (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

Controller 12 may also be configured to intermittently perform leak detection routines on fuel system 18 to confirm that the fuel system is not degraded. As such, leak detection routines may be performed while the vehicle is running with the engine on (e.g., during an engine mode of hybrid vehicle operation) or with the engine off (e.g., during a battery mode of hybrid vehicle operation). The leak tests performed may include applying a positive pressure on the fuel system for a duration (e.g., until a target fuel tank pressure is reached) and then sealing the fuel system while monitoring a change in fuel tank pressure (e.g., a rate of change in the pressure, or a final pressure value). The leak tests performed may also include applying a negative pressure on the fuel system for a duration (e.g., until a target fuel tank vacuum is reached) and then sealing the fuel system while monitoring a change in fuel tank pressure (e.g., a rate of change in the vacuum level, or a final pressure value).

To perform the leak test, following a key-off event, canister purge valve 112 and canister vent valve 114 may be closed and isolation valve 110 may be opened to seal the fuel system from atmosphere. Further, fuel tank 20 may be sealed off from secondary fuel tank 40 by closing valve 111. Fuel pump 21 may be activated to transfer fuel from the fuel tank 20 to the secondary fuel tank 40, or from the secondary fuel tank 40 to the fuel tank 20. By changing the volume of the fuel tank 20, the vapor space of the fuel tank is also changed, causing an increase of decrease in pressure in the fuel tank 20, vapor canister 22, and purge line 28. For example, if fuel is transferred from the fuel tank 20 to the secondary fuel tank 40, the vapor space in the fuel tank 20 increases, thus decreasing the pressure of the fuel tank 20 and associated components. Further, the resultant increased volume of the secondary fuel tank 40 decreases the vapor space of the secondary fuel tank 40, causing an increase in pressure in the secondary fuel tank 40.

Then, after a threshold fuel tank pressure has been reached (for example, a threshold negative pressure in the fuel tank 20), the isolation valve may be closed while a fuel tank pressure bleed-up (or bleed-down if the applied pressure was positive pressure) is monitored at pressure sensor 120 and 121. Based on the pressure bleed-up rate (or bleed-down rate) and the final stabilized fuel tank pressure following the application of the negative or positive pressure, the presence of a fuel system leak may be determined. For example, in response to a bleed-down rate (e.g., vacuum decay rate) that is faster than a threshold rate, a leak may be determined and fuel system degradation may be indicated.

It will be appreciated that the fuel system may be operated in various purging modes based on whether a canister purging operation occurred after pressure was applied for leak testing, and further based on the nature of the applied pressure. For example, the controller may operate the fuel system in a first purging mode if a purging operation occurs immediately after a negative pressure was applied for a negative pressure leak test. Herein, the controller may decrease the duration of the purging to compensate for fuel vapors that may have been purged from the canister to the engine intake during the leak test. If negative pressure was not applied to the fuel tank immediately before the purging, the controller may operate the fuel system in a second (e.g., default) purging mode wherein the purge flow rate and duration is based on the canister load and engine operating conditions.

Returning to FIG. 1, vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, MAP sensor 118, and pressure sensor 129. Other sensors such as additional pressure, temperature, air/fuel ratio, and composition sensors may be coupled to various locations in the vehicle system 6. As another example, the actuators may include fuel injector 66, isolation valve 110, valve 111, purge valve 112, vent valve 114, fuel pump 21, and throttle 62. The control system 14 may include a controller 12. The controller may receive input data from the various sensors, process the input data, and trigger the actuators in response to the processed input data based on instruction or code programmed therein corresponding to one or more routines. An example control routine is described herein with regard to FIG. 2.

Figure 2:
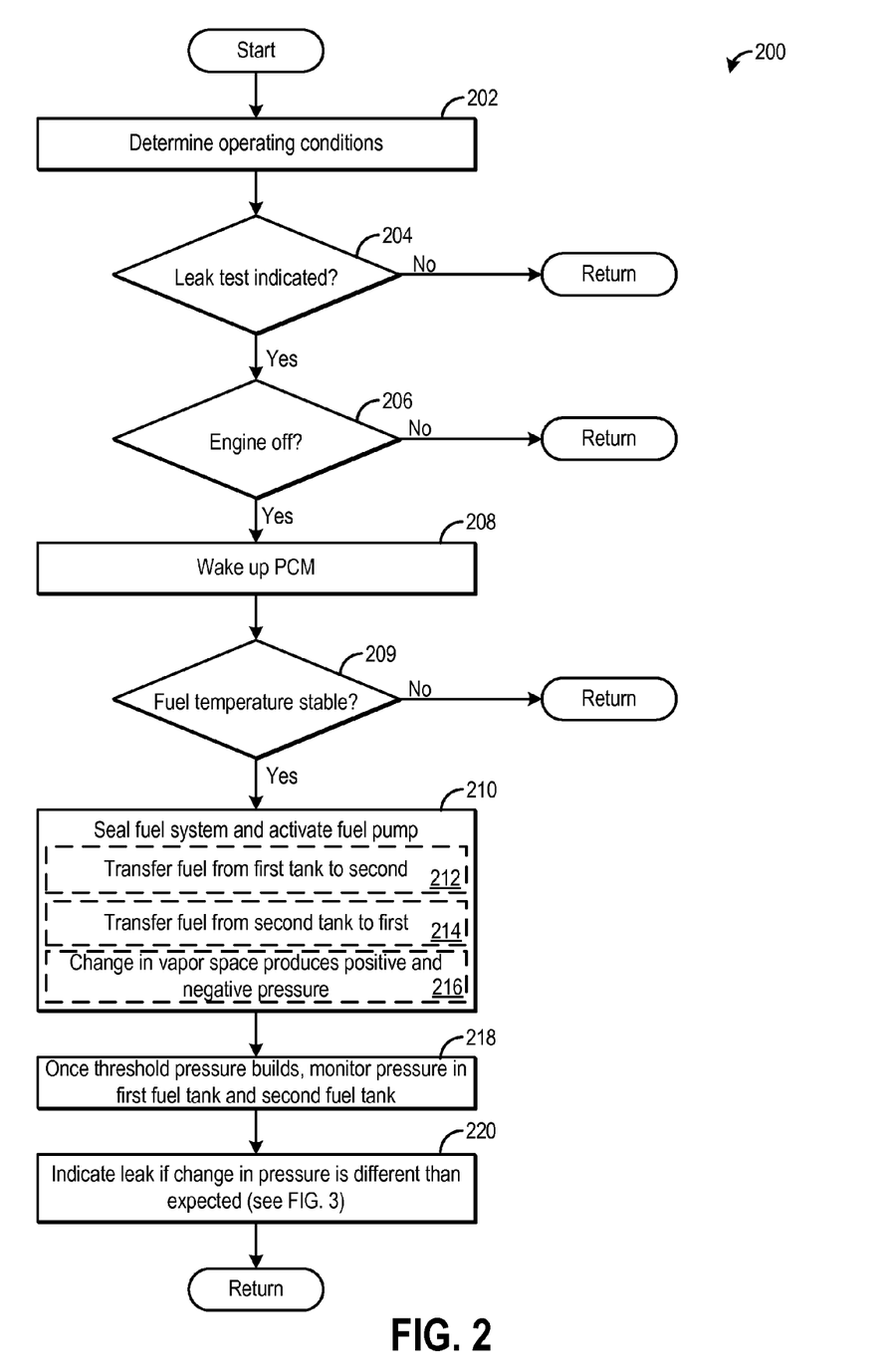
FIG. 2 is a flow chart illustrating a method for performing a fuel system leak detection test according to an embodiment of the present disclosure.
Figure 3:
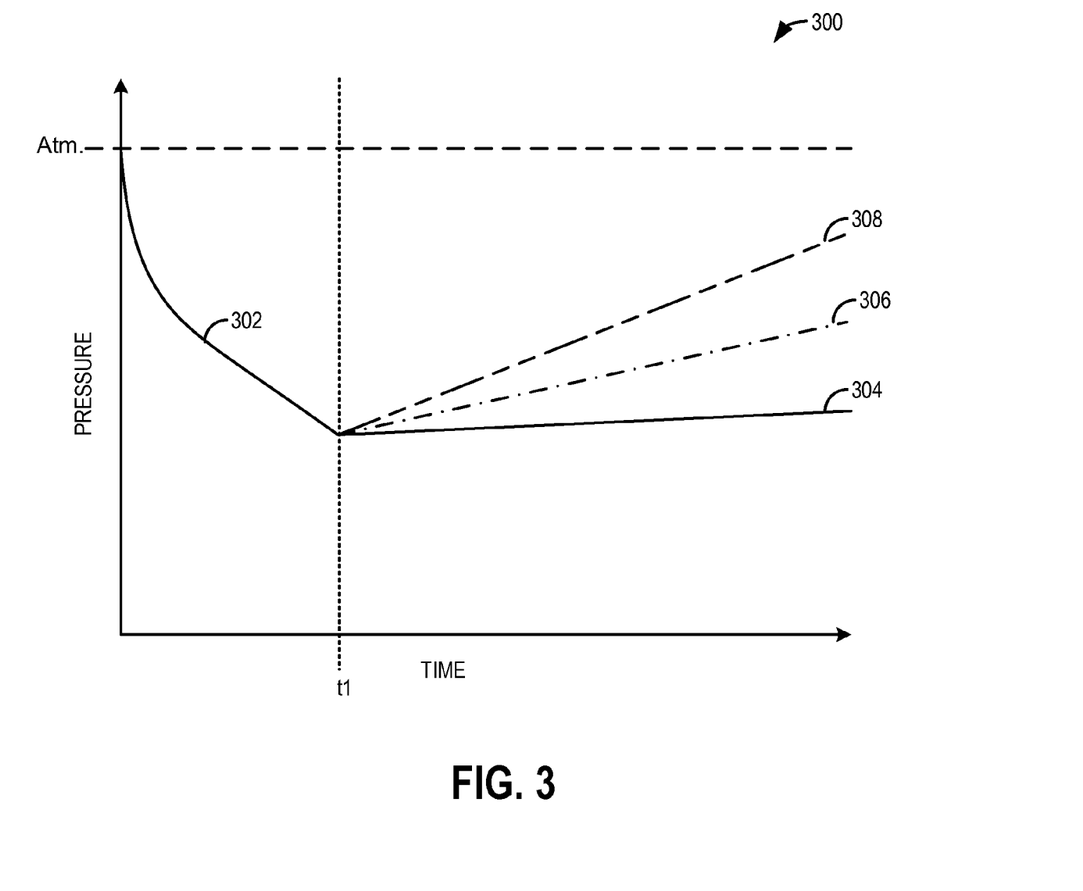
FIG. 3 is a diagram illustrating example fuel system pressure changes during a leak detection test.

FIG. 2 illustrates a method 200 for performing a leak detection test on a fuel system with two fuel tanks. As explained above with respect to FIG. 1, a first, primary fuel tank (such as fuel tank 20) may be coupled to a second fuel tank (e.g., secondary fuel tank 40). To build pressure in the fuel system, a fuel pump (e.g., fuel pump 21) may include a jet pump that is activated to evacuate fuel from one fuel tank to another fuel tank. Method 200 may be carried out by an engine control system, such as controller 12.

At 202, method 200 includes determining engine operating parameters. The engine operating parameters may include engine speed, load, fueling conditions (e.g., amount of fuel in fuel tank, whether the fuel system is in a purge mode, etc.), and time since a previous leak detection test was performed. At 204, it is determined if a leak test is indicated. The leak test may be performed at engine shut-down when operating conditions indicate that ambient temperature, barometric pressure, and/or fuel tank level are in a range for performing the test. For example, the leak test may only be performed if the engine is off, ambient temperature is between 40-95° F., altitude is less than 8500 ft, and the fuel tanks are between 15-85% capacity. If the leak test is not indicated, method 200 returns.

If the leak test is indicated, method 200 proceeds to 206 to determine if the engine is off. In some embodiments, the leak test may be performed if the engine is on or off. However, in other embodiments, the leak test may only be performed if the engine is off, to reduce testing noise resulting from excess engine heat, fuel sloshing, etc. If the engine is not off, method 200 returns. If the engine is off, method 200 proceeds to 208 to wake up the engine powertrain control module (PCM). After the PCM is woken up, at 209, method 200 includes determining if fuel temperature is stable. The fuel temperature may be the temperature inside one or both of the fuel tanks, measured by a sensor in the fuel tank, for example. If the fuel temperature is not stable, the changing temperature may result in a change to the fuel system pressure, confounding results of the leak detection test. Thus, if the fuel temperature is not stable (e.g., changing by more than a threshold amount, such as 3%, over a given duration), method 200 returns.

If the fuel temperature is stable, method 200 proceeds to 210 to seal off the fuel system from atmosphere and activate the fuel pump to transfer fuel between the first and second fuel tanks. The fuel system may be sealed by closing one or more valves that couple the fuel system to atmosphere, such as purge valve 112 and vent valve 114. Further, the first fuel tank may be isolated from the second fuel tank by closing a valve coupling the tanks, such as valve 111. Fuel may be transferred from the first tank to the second tank, as indicated at 212, or it may be transferred from the second fuel tank to the first fuel tank as indicated at 214. Whether fuel is transferred from the first to the second tank may be determined based on various operating parameters. For example, the fuel pump may be configured to only transfer fuel in one direction. If the fuel pump can transfer fuel in both directions, the fuel tank with a greater amount of fuel may have its fuel evacuated to the other tank. Further, the amount of fuel transferred from one tank to another may also be a function of the relative amounts of fuel in each tank. For example, if the first fuel tank is full, half the fuel in the tank may be transferred. If the first fuel tank is a quarter full, all the fuel in the first fuel tank may be transferred.

When the fuel is transferred from one tank to another, the change in vapor space of the two fuel tanks results in both positive pressure and negative pressure being applied to various parts of the fuel system, as indicated at 216. For example, vacuum is produced in the fuel tank losing fuel due to the increase in vapor size of that tank, and positive pressure is produced in the fuel tank gaining fuel. The pressure resulting from the fuel transfer is applied to the fuel tanks and other fuel system components and conduits coupled to the fuel tanks. For example, when pressure is applied to the first fuel tank, pressure may build in the first fuel tank, fuel vapor canister, and conduits coupling the fuel tank to the canister and coupling the canister to the intake of the engine.

At 218, the change in fuel system pressure is monitored after a threshold pressure is reached. The threshold pressure may be the maximum amount of pressure resulting from the transfer of fuel between fuel tanks. This threshold pressure may be determined based on the ideal gas law, $P=nRT/V$, in which the change of pressure is inversely proportional to the change in volume of the vapor space (e.g., the volume of the fuel tank that does not contain liquid fuel) of the fuel tank. The rate of change of pressure in the fuel system (for both tanks, and positive and negative pressure) may then be monitored after the threshold amount of pressure has built. In one example, the fuel system pressure is a fuel tank pressure estimated by a pressure sensor coupled between the fuel tank and the canister of the fuel system. Monitoring the fuel system pressure may include monitoring a rate of change in the fuel tank pressure and/or monitoring a stabilized fuel tank pressure following the application of the pressure.

As such, following isolation of the fuel system, the fuel system pressure (herein, the fuel tank pressure) may be expected to equilibrate back towards atmospheric pressure at a defined rate (based on a reference orifice size). If a leak is present, the monitored fuel tank pressure may be expected to reach to the atmospheric pressure at a faster rate.

Accordingly a rate of change in the fuel tank pressure following application of the pressure may be determined and compared to a threshold rate. If the rate of fuel system pressure decay is larger than the threshold rate, (that is, if following application of the pressure, the rate of change in fuel tank pressure is faster than the threshold rate), then, at 220, fuel system degradation may be determined. As used herein, the rate of change may be an absolute rate of change in the fuel tank (negative or positive) pressure. Fuel system degradation may be indicated by setting a diagnostic code (e.g., by setting a malfunction indication light). An orifice size of the leak may be determined based on a difference between the absolute rate of change in the fuel system pressure and the threshold rate. Specifically, as the difference increases, a larger orifice size of the leak may be indicated. In comparison, if the rate of fuel system pressure decay is smaller than the threshold rate (that is, if following application of the pressure, the rate of change in fuel tank pressure is slower than the threshold rate), no fuel system degradation (based on the pressure leak test) may be determined. Additional detail about detecting the leak based on pressure change is presented below with respect to FIG. 3.

If fuel system degradation is detected, the controller may take default action, such as notifying an operator of the vehicle by lighting the malfunction indicator lamp, setting a diagnostic code for later engine service, and/or adjusting engine operating parameters. For example, if a leak in the fuel system is detected, purging of fuel vapors to the engine may be performed more or less frequently.

Thus, method 200 of FIG. 2 provides for detecting fuel system degradation based on a change in fuel system pressure after pressure has been applied to the sealed fuel system. Pressure may be applied by transferring fuel from a first fuel tank to a second fuel tank. In doing so, natural pressure may be built without activating a separate pressure-building device, such as a vacuum pump, even in engines that do not build significant fuel vapors.

FIG. 3 is a diagram 300 illustrating pressure change in a fuel system following the application of negative pressure during a leak detection test, such as the test illustrated by the method of FIG. 2. Time is illustrated along the horizontal axis, and pressure is illustrated along the vertical axis. Atmospheric pressure is indicated by the dashed line at the top of the vertical axis.

As shown by curve 302, when negative pressure is applied to a sealed fuel system, the pressure in the system decreases. Once a threshold pressure in the system has been reached at time t1, pressure may slowly rise back towards atmospheric pressure. A non-degraded fuel system that does not include a leak may have a rate of pressure rise illustrated by curve 304. However, if the fuel system is degraded and a leak is present, the pressure may increase faster than without a leak. The size of the orifice of the leak may be determined based on the rate of pressure change. For example, curve 306 illustrates a fuel system with a leak orifice of a first, smaller size, and thus the rate of pressure change is greater than the rate illustrated by curve 304 but less than the rate of change of a fuel system with a leak orifice of a second, larger size, illustrated by curve 308.

The engine control system may have a map corresponding to the rate of applied pressure (shown by curve 302), rate of pressure change expected with no leak (shown by curve 304), and rate of pressure change expected with a leak of a known size, illustrated by curve 306, for example. The pressure change curve for the system with a leak of a known size may represent a leak orifice size that is small enough to be tolerated (e.g., below current emission standard), and thus a rate that is greater than the known leak orifice size may trigger an indication that the fuel system is degraded. Furthermore, a change in the rate of applied pressure, illustrated by curve 302, may also indicate a degraded fuel system. For example, if the fuel system does not reach the threshold pressure, a leak may be indicated.

A similar map may include pressure changes for a system with the application of positive pressure. When fuel is transferred from a first fuel tank to a second fuel tank, negative pressure may build in the first fuel tank and positive pressure may build in the second fuel tank. Degradation of both tanks and accompanying components and conduits may be determined based on both change in negative pressure for the first fuel tank and change in positive pressure for the second fuel tank.

Figure 4:
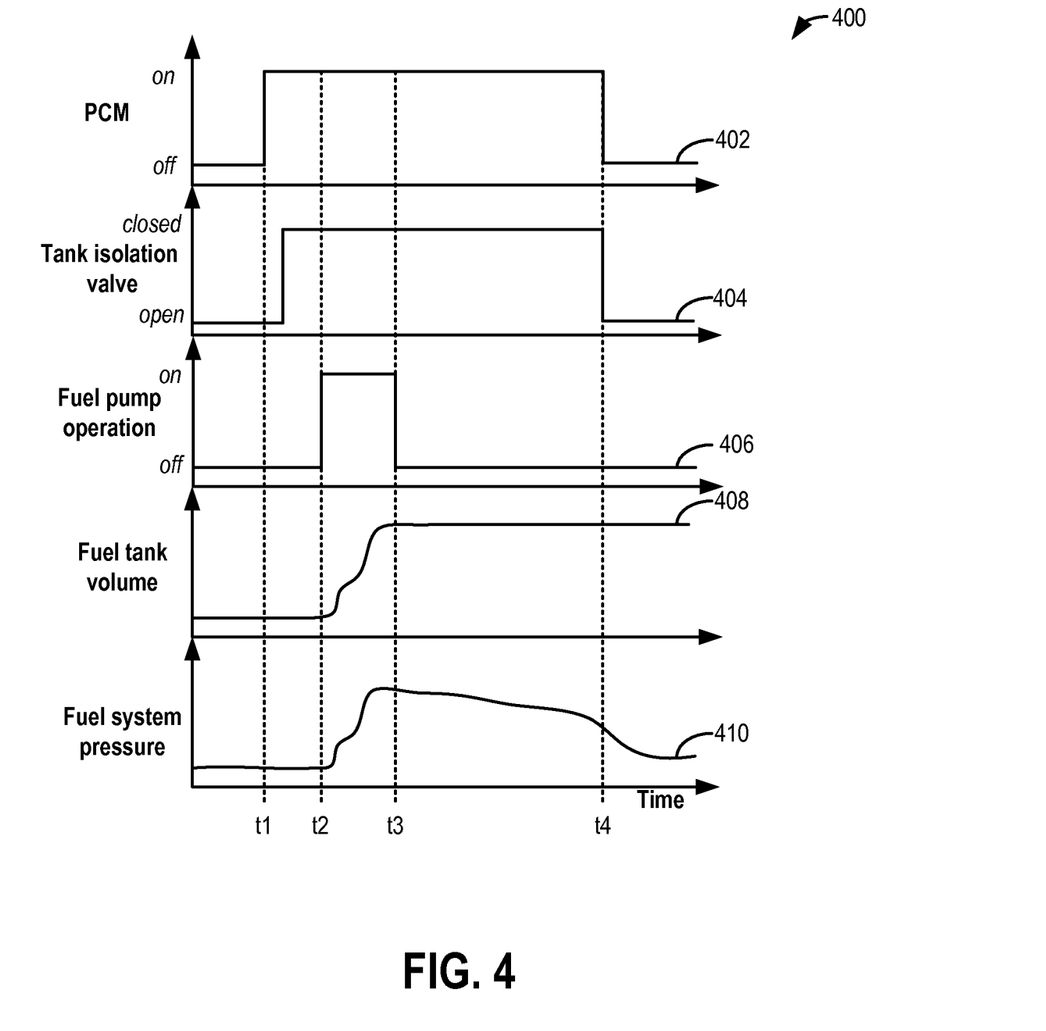
FIG. 4 is a diagram illustrating example fuel system parameters during a leak detection test.

FIG. 4 is a diagram 400 illustrating various fuel system parameters during a leak detection test as described with respect to method 200 of FIG. 2. The leak detection test may include transferring fuel from a first fuel tank to a second fuel tank and monitoring a change in pressure after a threshold pressure has built in the fuel system. As explained earlier, the leak detection test may be performed during an engine-off condition. As a result, the engine PCM, which regulates the valve closures, fuel transfer, and monitoring of pressure change during the test, is initially off prior to performing the leak detection test. Thus, as indicated by curve 402, prior to time t1, the PCM is off. At time t1, the PCM is woken up. Subsequently, as illustrated by curve 404, one or more valves isolated the fuel system from atmosphere and/or isolating the fuel tanks from each other is closed. For example, the tank isolation valve (e.g., valve 111 of FIG. 1) may be closed after the PCM is woken up. At time t2, the jet pump is activated (illustrated by curve 406) to transfer fuel from the first fuel tank to the second fuel tank. The fuel tank volume of the second fuel tank is illustrated by curve 408. As a result of the activated jet pump, the volume of the fuel in the second fuel tank increases. At time t3, the jet pump is deactivated and the fuel transfer ceases. Due to the transfer of fuel, the pressure in the second fuel tank and associated conduits and/or components increases, as shown by curve 410. For example, as explained earlier, the vapor space of the fuel tank decreases due to the increased volume of the fuel in the tank, and thus the pressure increases.

After the jet pump is deactivated at t3, a threshold (e.g., maximum) pressure is reached in the second fuel tank and system. Once this threshold pressure is built, the change in pressure in the system is monitored. As shown in FIG. 4, the pressure gradually decreases. The rate of change of the pressure decrease may be compared to a known rate of change (such as described with respect to FIG. 3) to determine is fuel system degradation is present. After the pressure is monitored for a given amount of time, the test ends at time t4. Thus, the PCM is shut off, the valve is opened, and the pressure rapidly drops back towards the starting pressure (e.g., ambient pressure). However, without reactivating the jet pump to transfer back to the first fuel tank, the fuel tank volume may remain the same as during the leak detection test, or the fuel levels in each tank may equilibrate over time after the leak detection test is over.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
closing an isolation valve arranged in a first passage coupling a first fuel tank with a second fuel tank;
activating a jet pump arranged in a second passage coupling the first fuel tank with the second fuel tank to evacuate fuel from the first fuel tank to the second fuel tank; and
indicating fuel system degradation responsive to a change in fuel system pressure following the evacuation of fuel.

2. The method of claim 1, further comprising applying negative pressure to the first fuel tank and positive pressure to the second fuel tank by evacuating the fuel.

3. The method of claim 2, further comprising monitoring a change in negative pressure built in the first fuel tank, and if pressure increases by greater than a threshold rate, then indicating fuel system degradation.

4. The method of claim 2, further comprising monitoring a change in positive pressure built in the second fuel tank, and if pressure decreases by greater than a threshold rate, then indicating fuel system degradation.

5. The method of claim 1, further comprising sealing off the fuel system from atmosphere prior to evacuating the fuel.

6. The method of claim 1, wherein the fuel comprises ethanol.

7. A method for a vehicle having a fuel system, comprising:
during an engine off condition, waking up a powertrain control module of the vehicle and activating a jet pump arranged in a passage coupling a first fuel tank with a second fuel tank to apply pressure to the fuel system by transferring fuel from the first fuel tank to the second fuel tank; and
once a threshold pressure in the fuel system is reached, indicating fuel system degradation in response to a subsequent change in fuel system pressure.

8. The method of claim 7, wherein indicating fuel system degradation in response to the subsequent change in fuel system pressure includes indicating a fuel system leak based on an absolute rate of change in the fuel system pressure being higher than a threshold rate.

9. The method of claim 8, wherein an orifice size of the fuel system leak is based on a difference between the absolute rate of change in the fuel system pressure and the threshold rate.

10. The method of claim 7, wherein the fuel system pressure is a fuel tank pressure of the first fuel tank estimated by a pressure sensor of the first fuel tank.

11. The method of claim 7, wherein the fuel system pressure is a fuel tank pressure of the second fuel tank estimated by a pressure sensor of the second fuel tank.

12. The method of claim 7, wherein the vehicle is a hybrid vehicle, and wherein the engine off condition comprises a battery operation mode of the hybrid vehicle.

13. A vehicle fuel system, comprising:
a first fuel tank including a fuel pump arranged therein;
a second fuel tank;
an isolation valve arranged in a first passage coupling the first and second fuel tanks;
a jet pump arranged in a second passage coupling the first and second fuel tanks;
a fuel vapor canister coupled to the first fuel tank; and
a controller including instructions to:
close the isolation valve;
activate the jet pump to transfer fuel from the first fuel tank to the second fuel tank to thereby manipulate a vapor space of the first fuel tank to apply pressure to the fuel system; and
indicate a leak in the fuel system based on a change in pressure of the fuel system following the application of pressure.

14. The vehicle fuel system of claim 13, wherein an amount of negative pressure applied to the first fuel tank is proportional to an amount of fuel transferred from the first fuel tank.

15. The vehicle fuel system of claim 13, wherein an amount of positive pressure applied to the second fuel tank is proportional to an amount of fuel transferred to the second fuel tank.

16. The vehicle fuel system of claim 13, wherein the first fuel tank and the second fuel tank are contained in a common fuel tank.

17. The vehicle fuel system of claim 13, wherein the fuel comprises ethanol.

18. The vehicle fuel system of claim 13, wherein the controller includes further instructions to manipulate the vapor space of the first fuel tank during an engine off condition.

19. The vehicle fuel system of claim 13, wherein the first and second fuel tanks are separate chambers of a single common fuel tank, and wherein the single common fuel tank is a saddle fuel tank configured to be placed over a driveline of an engine of the vehicle.

* * * * *